(12) United States Patent
Brady

(10) Patent No.: US 7,043,850 B2
(45) Date of Patent: *May 16, 2006

(54) TRANSPARENT MEASURING DEVICE WITH SEAM ALLOWANCE GUIDE

(76) Inventor: John R. Brady, 20041 Osterman, #R4, Lake Forest, CA (US) 92630

( * ) Notice: Subject to any disclaimer, the term of this patent is extended or adjusted under 35 U.S.C. 154(b) by 0 days.

This patent is subject to a terminal disclaimer.

(21) Appl. No.: 10/789,166

(22) Filed: Feb. 27, 2004

(65) Prior Publication Data

US 2004/0163269 A1    Aug. 26, 2004

Related U.S. Application Data

(63) Continuation-in-part of application No. 10/224,884, filed on Aug. 21, 2002, now Pat. No. 6,799,379.

(51) Int. Cl.
G01B 3/14    (2006.01)
G01B 3/02    (2006.01)
A41H 1/00    (2006.01)

(52) U.S. Cl. .............. 33/562; 33/11; 33/484; 33/494; 33/534

(58) Field of Classification Search ............ 33/489, 33/562, 563, 565, 566, 483, 484, 488, 113, 33/492, 493, 494, 679.1, 464, 3 A, 27.02, 33/27.03, 436, 438, 439, 534, 535, 485, 486, 33/487, 2 R, 2 H, 11, 16, 564; D10/64
See application file for complete search history.

(56) References Cited

U.S. PATENT DOCUMENTS

| | | | | |
|---|---|---|---|---|
| 776,897 A | * | 12/1904 | Ferris | ............... 33/27.03 |
| 864,396 A | * | 8/1907 | Weston | ................ 33/489 |
| 1,409,723 A | * | 3/1922 | Jacob | ................. 33/1 A |
| 1,523,919 A | | 1/1925 | Vitek et al. | .......... 33/474 |
| 1,745,188 A | | 1/1930 | Pipirs | |
| 1,808,705 A | * | 6/1931 | Owen, Jr. | ........... 33/27.03 |
| 1,825,266 A | * | 9/1931 | Fischer | ............. 33/27.03 |
| 2,004,951 A | * | 6/1935 | Jensen | ................ 33/431 |
| 2,104,354 A | * | 1/1938 | Rick | .................. 33/425 |
| 2,238,190 A | * | 4/1941 | Sawtelle | ............. 33/457 |
| 2,246,491 A | * | 6/1941 | Abell | ................. 33/489 |
| 2,265,893 A | * | 12/1941 | Bruehl | ............... 33/470 |
| 2,352,169 A | * | 6/1944 | Alexander | ........... 33/484 |
| 2,371,485 A | * | 3/1945 | Waldman | ............ 33/565 |
| 2,513,404 A | * | 7/1950 | Di Maria | ............ 33/464 |
| 2,519,727 A | | 8/1950 | Yezdan | |
| 2,542,537 A | * | 2/1951 | Klemm | ............. 33/27.03 |
| 2,563,191 A | | 8/1951 | Russ | |

(Continued)

*Primary Examiner*—R. Alexander Smith
(74) *Attorney, Agent, or Firm*—Stetina Brunda Garred & Brucker

(57) ABSTRACT

A transparent measuring device having a planar structure, a plurality of markings, at least one window, and a seam allowance guide. The planar structure has an upper surface and a lower surface, and the markings are formed on the lower surface of the planar structure. The markings are formed as a plurality raised ribs protruding from the lower surface of the planar structure. The raised ribs are fabricated from transparent material and so configured to induce visual graduation of light beams propagating therethrough. The seam allowance guide is removably and slidably attached to the planar structure at the window. The seam allowance guide has an upper guide bar and a lower guide bar, and the distance between the upper and lower guide bars automatically calculates a seam allowance for a desired pattern.

64 Claims, 6 Drawing Sheets

U.S. PATENT DOCUMENTS

| | | |
|---|---|---|
| 2,604,702 A | 7/1952 | Collins |
| 2,736,097 A | 2/1956 | Coleman, Jr. |
| 2,892,437 A | 6/1959 | Natoli |
| 2,948,064 A | 8/1960 | Wentsel |
| 2,959,861 A * | 11/1960 | Stromquist .................. 33/419 |
| 3,068,580 A * | 12/1962 | Orthwin ...................... 33/783 |
| 3,243,882 A * | 4/1966 | Merrifield .................... 33/424 |
| 3,345,748 A * | 10/1967 | Snyder ......................... 33/2 R |
| 3,460,261 A * | 8/1969 | Frey ............................. 33/403 |
| 3,496,640 A * | 2/1970 | Warner ...................... 33/1 SD |
| 3,598,493 A * | 8/1971 | Fisher .................... 250/231.16 |
| 3,727,242 A * | 4/1973 | Miller ........................... 4/314 |
| 3,738,010 A * | 6/1973 | Carder ......................... 33/489 |
| 3,950,072 A * | 4/1976 | Aten ........................... 359/436 |
| 4,095,342 A * | 6/1978 | Oertli ......................... 33/1 SD |
| 4,358,897 A * | 11/1982 | Hornbeck .................... 33/343 |
| 4,513,510 A * | 4/1985 | Swanson ...................... 33/419 |
| 4,530,156 A * | 7/1985 | Kettlestrings .............. 33/27.01 |
| 4,736,526 A * | 4/1988 | Hsia ............................ 33/565 |
| 4,742,619 A | 5/1988 | Swanson |
| 4,779,346 A | 10/1988 | Schafer |
| 4,791,733 A * | 12/1988 | Pan et al. ..................... 33/403 |
| 4,821,424 A * | 4/1989 | Loggins ....................... 33/474 |
| 4,926,564 A * | 5/1990 | Loggins ....................... 33/474 |
| 4,965,943 A | 10/1990 | Adams |
| 5,101,569 A | 4/1992 | Watkins |
| 5,125,161 A * | 6/1992 | Guthrie .................... 33/27.03 |
| 5,193,284 A * | 3/1993 | Lin .............................. 33/449 |
| 5,347,721 A | 9/1994 | Asterino, Jr. .............. 33/27.01 |
| 5,384,964 A * | 1/1995 | McKay ...................... 33/27.03 |
| 5,461,795 A | 10/1995 | Kok |
| 5,511,316 A | 4/1996 | Fischer et al. |
| 5,551,160 A * | 9/1996 | Ferris et al. .................. 33/452 |
| 5,557,996 A | 9/1996 | Reber et al. |
| 5,577,328 A | 11/1996 | Kerry, Sr. .................... 33/563 |
| 5,615,488 A * | 4/1997 | Brady .......................... 33/484 |
| 5,628,118 A * | 5/1997 | Rivera ......................... 33/449 |
| 5,653,035 A * | 8/1997 | Chen ........................... 33/484 |
| 5,704,263 A * | 1/1998 | Swanberg ...................... 83/13 |
| 5,746,001 A | 5/1998 | Fisher |
| 5,749,149 A | 5/1998 | Claytor |
| 5,819,422 A | 10/1998 | Schafer |
| 6,093,182 A | 7/2000 | Lampropoulos et al. |
| 6,158,135 A | 12/2000 | Rank |
| 6,205,673 B1 | 3/2001 | Larsen et al. ................. 33/810 |
| 6,237,238 B1 * | 5/2001 | Shapiro ....................... 33/471 |
| 6,405,443 B1 * | 6/2002 | Thorn et al. .............. 33/27.03 |
| 6,457,247 B1 * | 10/2002 | Lin ............................... 33/471 |
| 6,591,511 B1 * | 7/2003 | Carroll et al. ............... 33/474 |
| 6,606,796 B1 * | 8/2003 | Stoneberg ................. 33/27.03 |
| 6,799,379 B1 * | 10/2004 | Brady ......................... 33/562 |
| 6,813,842 B1 * | 11/2004 | Wang ..................... 33/501.45 |

\* cited by examiner

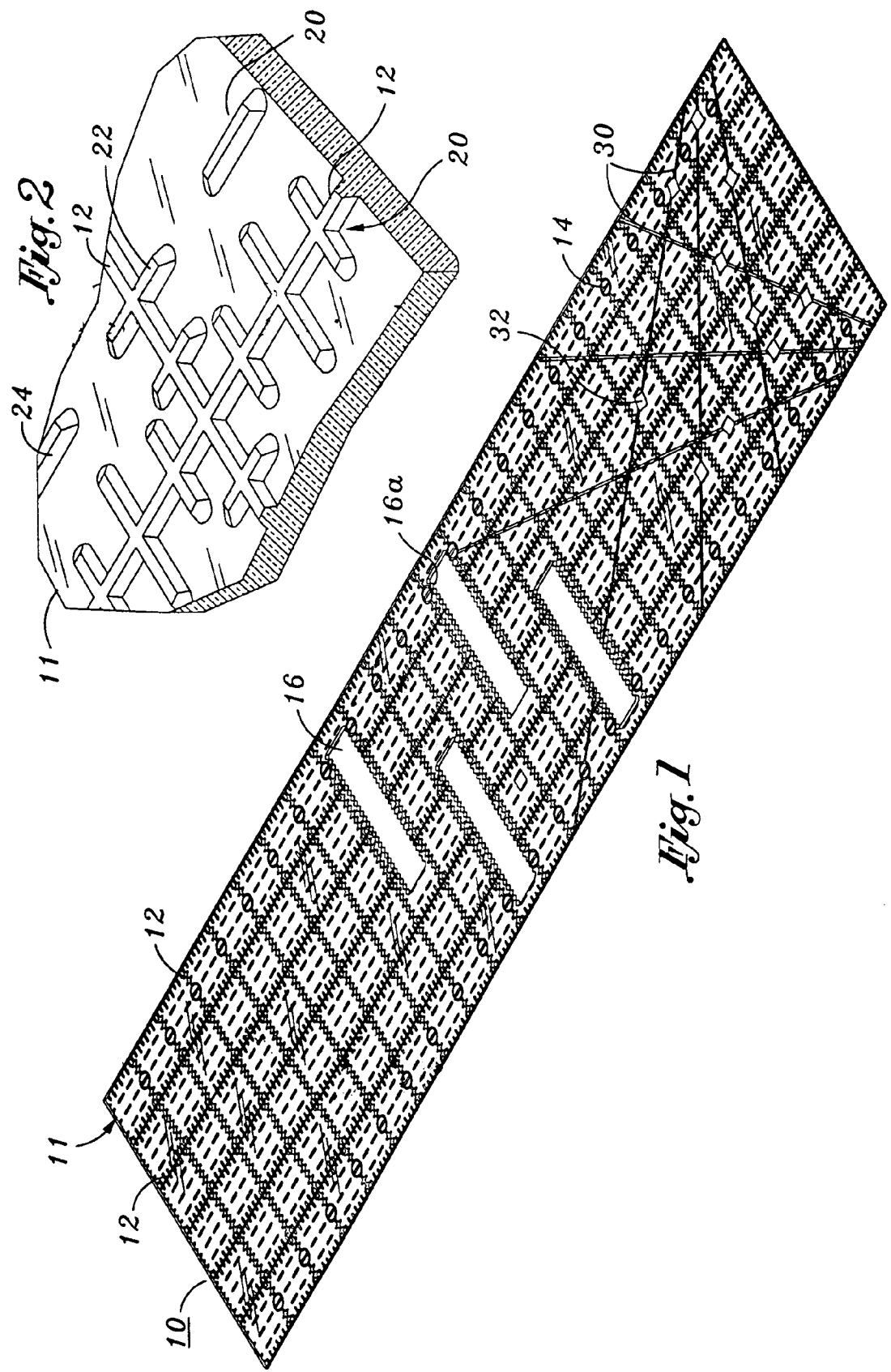

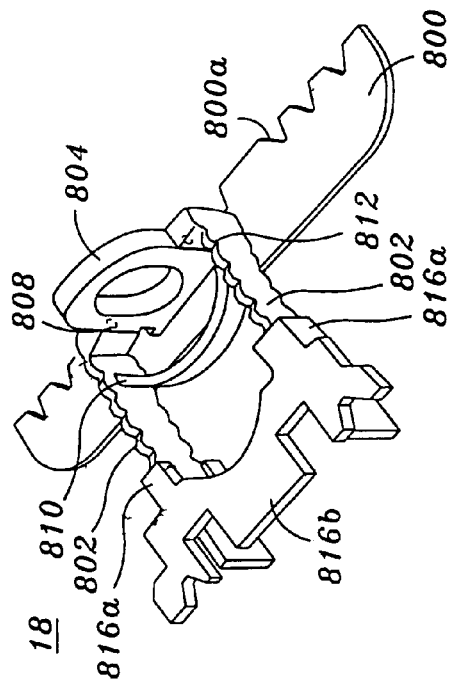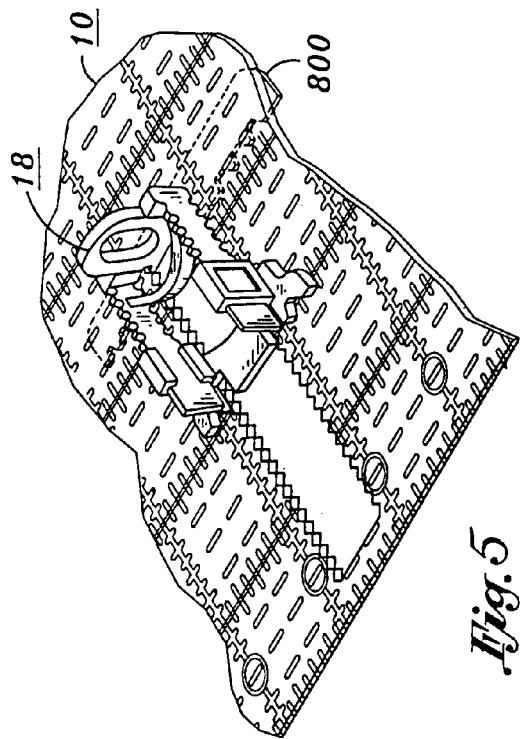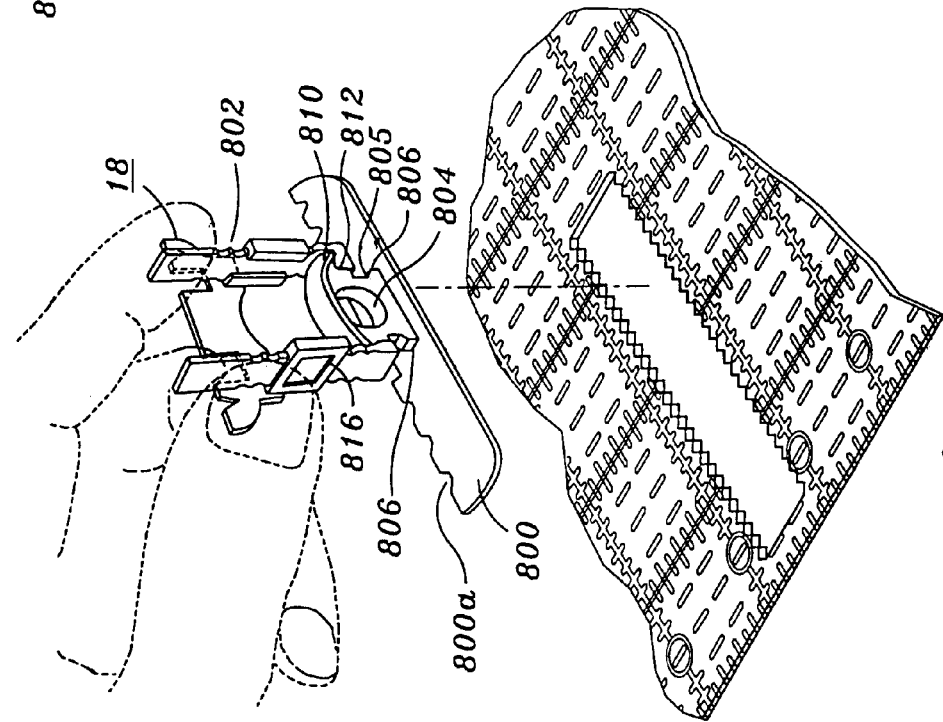

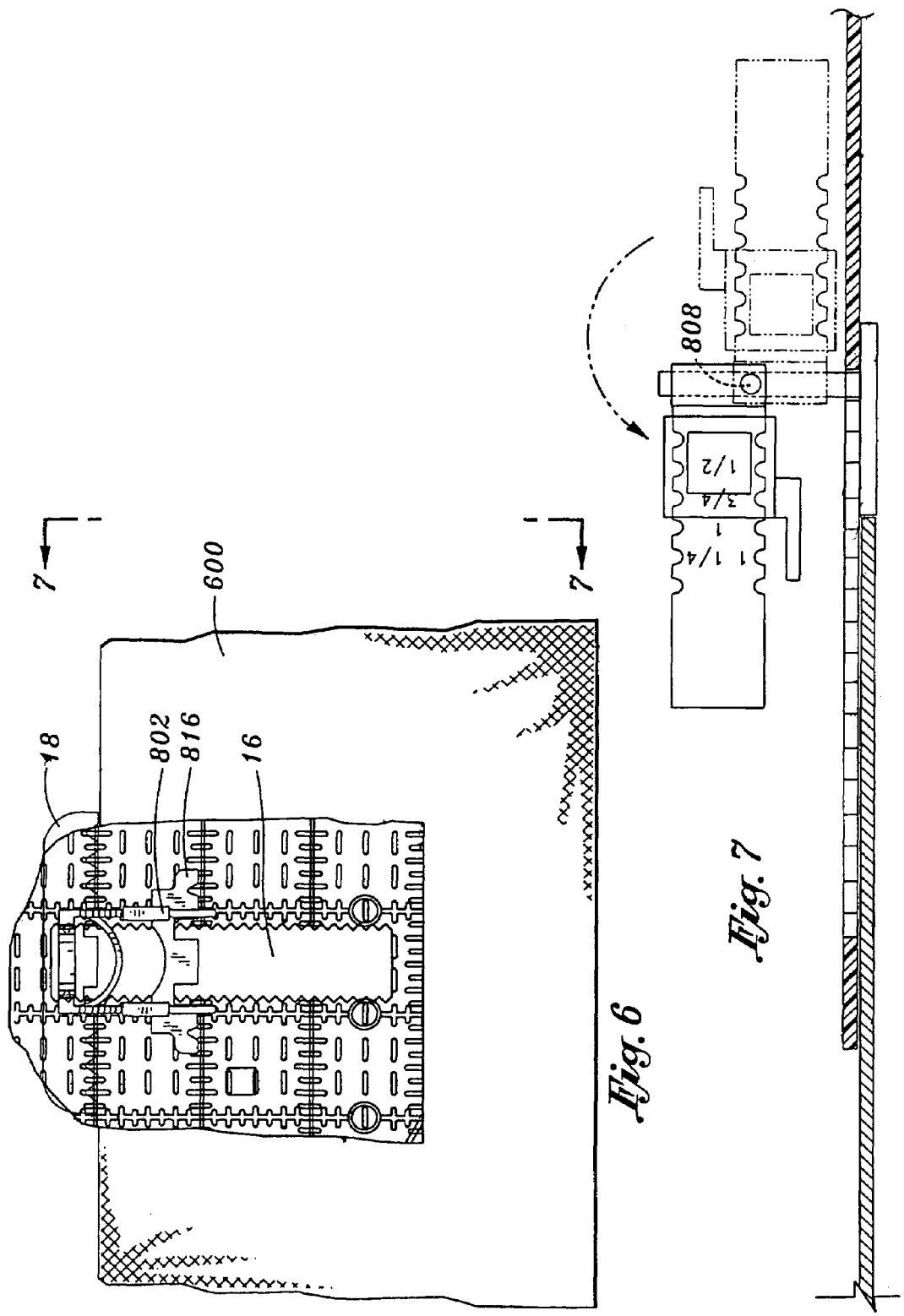

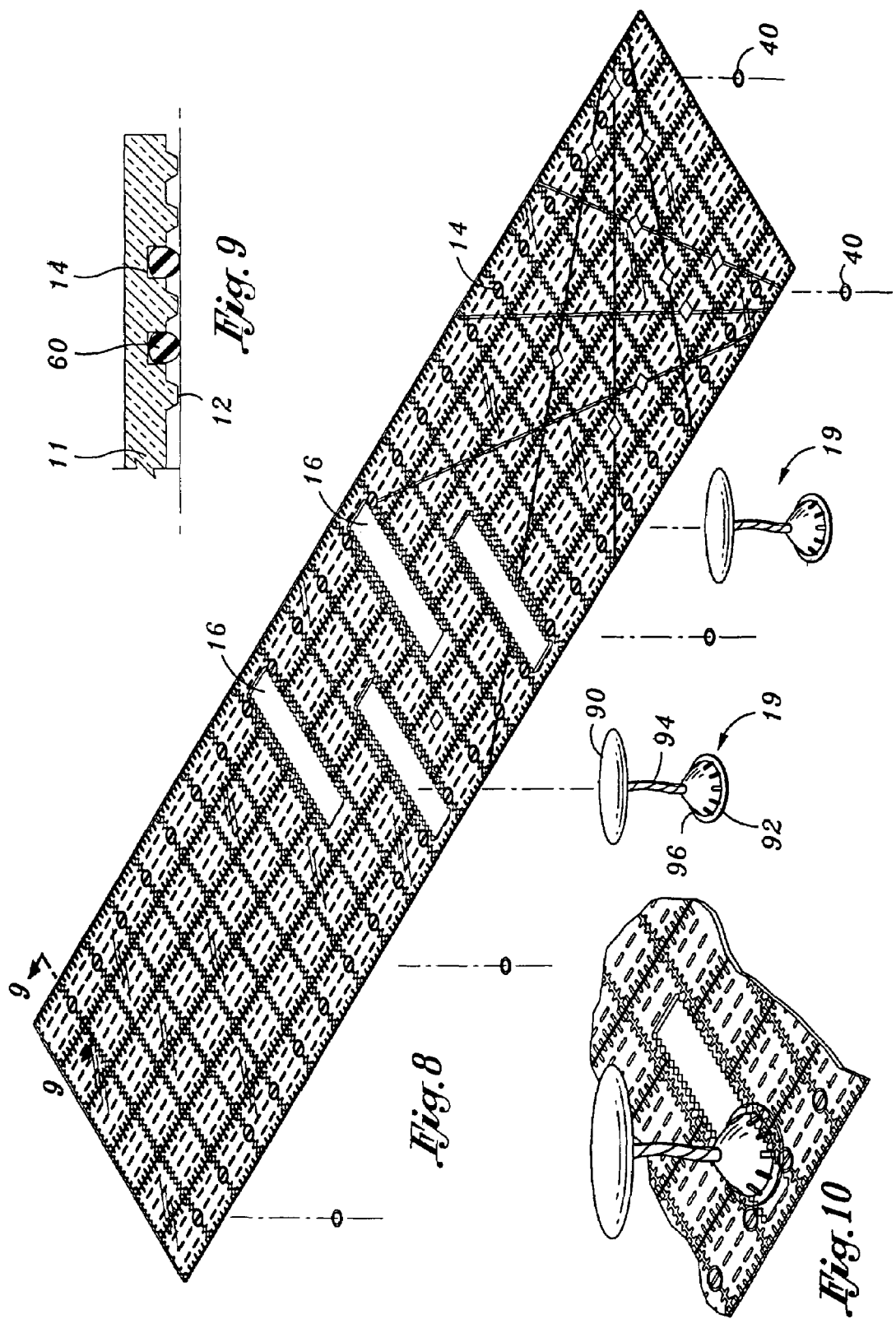

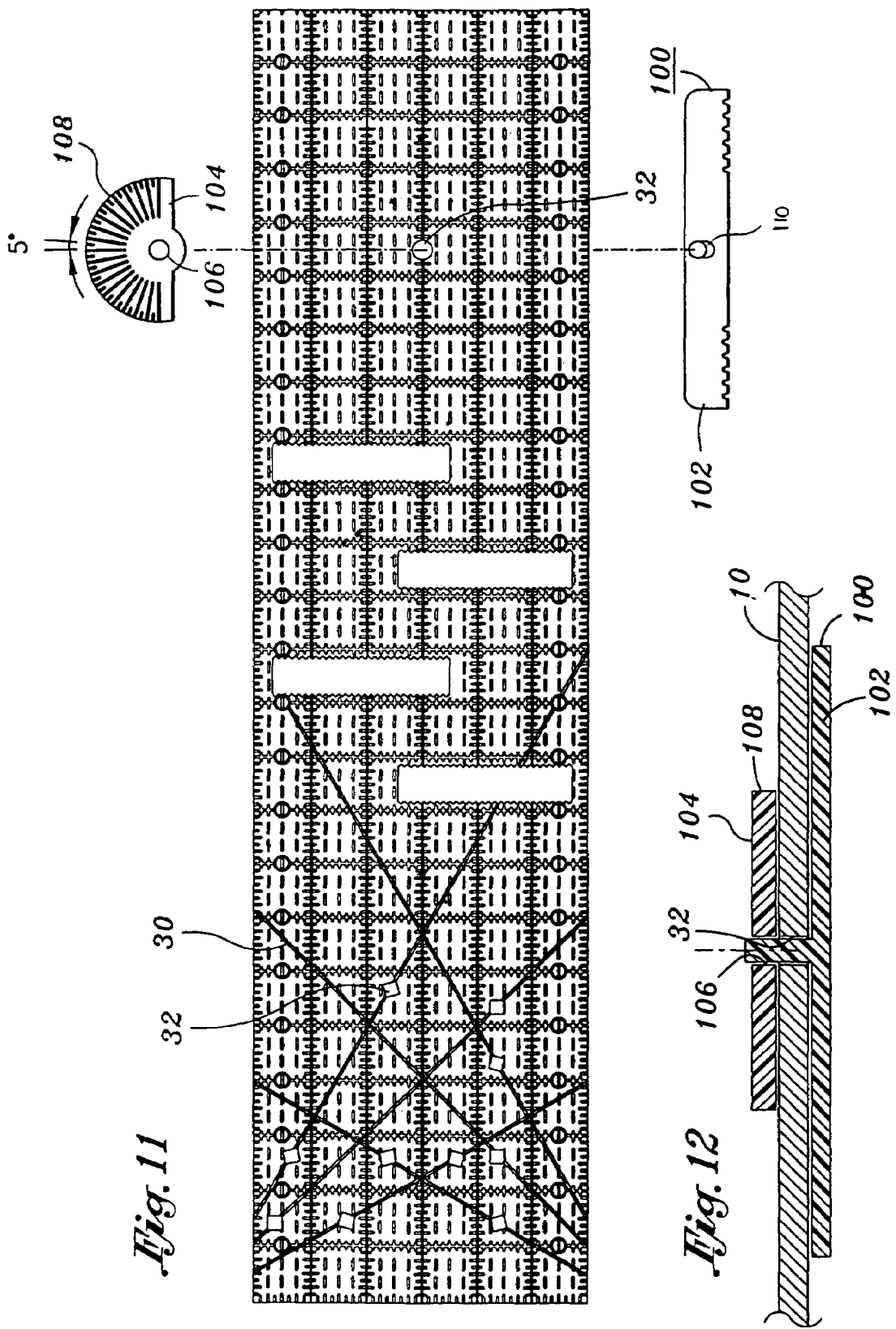

TRANSPARENT MEASURING DEVICE WITH SEAM ALLOWANCE GUIDE

CROSS-REFERENCE TO RELATED APPLICATIONS

The present invention is a continuation in part application of a U.S. patent application Ser. No. 10/224,884, entitled "Transparent Measuring Device" filed Aug. 21, 2002 now U.S. Pat. No. 6,799,379 the disclosure of which is expressly incorporated herein by reference.

STATEMENT RE: FEDERALLY SPONSORED RESEARCH/DEVELOPMENT

Not Applicable

BACKGROUND OF THE INVENTION

The present invention relates in general to a measuring device, and more particular, to a transparent measuring device that provides a guide for facilitating seam allowance for cutting or marking materials or fabrics into various patterns.

The introduction of the rotary cutter and acrylic rules has changed quilting dramatically. Instead of using individual templates or patterns and scissors, a user could simply measure the fabric through a clear acrylic ruler and cut a straight edge with one motion. A couple of short cuts were also developed for some of the more commonly used shapes in quilting. Two examples of such short cuts are the half-square and quarter-square triangles made by first cutting a square and then cutting the square in halves diagonally once for half-square triangles or twice for quarter-square triangles. Though easier compared to using an individual template or pattern, this procedure can still be confusing to the average quilter to add the proper amount of seam allowance.

Seam allowance is the amount of fabric that will be taken up in joining the individual pieces together by sewing. The joined portions end up on the inside of a quilt and therefore do not add to the dimensions of the quilt. Quilters refer to these pieces as the unfinished size before they are joined together and as the finished size after they are joined together. The most common seam allowance is ¼". To cut a square or a rectangular shape, ½" has to be added to the finished size, that is, each side of the unfinished size is typically ½" longer than that of the finished size. For example, if a 2" square finished size is required, a square with each side of 2½" has to be cut. The seam allowance is ⅞" for a half-square triangle and 1¼" for a quarter-square triangle. Therefore, to cut a half-square triangle with a finished size of 2", a square with each side of 2 and ⅞ inches is required to leave an extra ¼" around the triangles to be sewn into the seams. For a quarter-triangular finished size, each side of the square of unfinished size has to be 1¾".

In addition to the different seam allowances that may confuse quilters, conventional rulers and yard sticks have several other disadvantages when being used for cutting fabrics with various colors and patterns. For example, it is inconvenient to lift and move the rulers and the yard sticks with a larger surface area, and the marks and lines on transparent rulers and yardsticks are often difficult to see when the fabric to be marked is similar in color to the ruler. Further, the angle measurement is often restricted to the number of angled lines and markings formed on the ruler and the yard sticks.

It is therefore a substantial need to provide an easily handled measuring device that provides clear and precise marking and cutting aids even when the fabric to be marked or cut has a dark color. The measuring device should also provide a seam allowance guide for at least the commonly used quilting shapes such as square, half-square triangle and quarter-square triangle.

BRIEF SUMMARY OF THE INVENTION

The present invention provides a transparent measuring device comprising a planar structure, a plurality of indicator markings, at least one window, and a seam allowance guide. The planar structure has an upper surface and a lower surface, and the markings are formed on the lower surface of the planar structure. The window comprises an opening or aperture which extends through the planar structure. The seam allowance guide is removably attached to the planar structure at differing locations adjacent the window. The markings preferably include a plurality of raised ribs protruding from the lower surface of the planar structure. The raised ribs are fabricated from transparent material and preferably configured to induce visual graduation of light beams propagating therethrough. In one embodiment, the window has a rectangular shape and a plurality of notches are formed along two opposing elongate sides of thereof. The notches are about ⅛" in length, for example.

In one exemplary embodiment, the seam allowance guide includes a lower guide bar or straight edge to extend transversely to the window under the planar structure and an upper guide bar or straight edge operative to rotate about an elongate axis of the lower guide over the planar structure. The seam allowance guide further comprises a pivoting connection structure and a pair of extension arms pivotally connected to the pivoting connection structure. The pivoting connection structure projects from a central portion of the lower guide bar, and the upper guide bar is slidably attached to the extension arms. The distance between the lower guide bar and the upper guide bar indicates a seam allowance for a desired pattern, and such distance is adjustable by sliding the upper guide bar to various positions along the length of the extension arms. A plurality of seam allowance markings or indicia for various patterns may be printed or marked on the extension arms. Therefore, by sliding the upper guide bar to align with the seam allowance markings, various seam allowances are automatically calculated and obtained.

The extension arms are preferably pivotally connected to two opposing vertical sidewalls of the pivoting connection structure by connection devices such as pins, ball joints or hinges. The lower portions of the vertical sidewalls further comprise a pair of recesses and a pair of protruding tabs. By inserting the lower guide bar under the planar structure and leveling the recesses with the edges of the window, the seam allowance guide can be manually rotated horizontally within the window. When the seam allowance guide is rotated until the lower guide bar under the planar structure extends transversely to the window, the protruding tabs can be selectively engaged with the notches formed on the edges of the window by pulling the guiding tab upwardly into the notches.

The seam allowance guide may also include a bridge extending between the extension arms which are sized to accommodate the pivotal movement of the extension arms. The lower guide bar includes an elongate measuring edge on which a plurality of notches is formed to aid in alignment and measurement. The upper guide bar includes a pair of mounting sleeves to slidably mount the upper guide bar to the extension arms. The exterior side of each mount sleeve includes an open window, such that the selected seam allowance marking on the extension arm can be easily observed.

To allow the upper guide bar fixed at a position that automatically calculates the seam allowance for the most commonly required pattern, the seam allowance guide further comprises a living hinge structure. In the structure, the free ends of the extension arms may be folded at predetermined hinge points to form a pair of folded portions overlapped with each other. The hinge points are so determined that the seam allowance marking of a selected pattern is automatically calculated. A pair of latching structures may be formed in the folded portions to secure the folding status. The latching structures include holes extending the folded portions and aligned with each other, such that the folded portion can be latched with each other by a latching pin inserting through the holes. Alternatively, frictional fit structures can also be formed on the folded portions of the extension arms to serve as the latching structures.

To prevent slippage of an object such as a piece of fabric placed underneath the measuring device, the planar structure further may include a plurality of circular grooves recessed in the lower surface thereof for mounting a plurality of elastomeric O-rings therein. Each of the O-rings has a cross-sectional diameter equal to or greater than the height of the raised ribs, such that the O-rings contact the underlying fabric. Therefore, the contact between the fabric and the raised ribs and the contact between the fabric and the O-rings exert sufficient frictional force to prevent slippage of the fabric relative to the measuring device.

The transparent measuring device may further comprise at least one handle to be inserted through one of the windows and facilitate easy repositioning of the measuring device upon the fabric. The handle comprises a finger grip portion shaped to be inserted through the window, a latching disc portion selectively attachable to the planar structure at the window, and a tether/string interconnecting the finger grip portion to the disc portion. The disc portion further comprises a plurality of latching fins formed along the periphery of its top surface for releasably engaging the plurality of notches formed along the elongate edges of the window.

The transparent measuring device may further comprise an angle guide, which comprises an elongate tab to be placed under the planar structure and a protractor member adjacent to the upper surface of the planar to be rotatably attached to the elongate tab. The protractor includes a plurality of angle/degree indicia or markings along the periphery thereof. To attach the angle guide to the measuring device, the planar structure includes a through hole, and the angle guide includes a pair of connecting structures extending through the through to rotatably connect the protractor member and the elongate tab. Preferably, the connecting structures includes a post projecting from the center of the elongate tab and a circular hole extending through the origin of the protractor member.

The present invention may further provide a transparent measuring device for measuring and cutting an underlying object, which comprises a transparent planar structure, a plurality of transparent markings, and a plurality of windows formed in the planar structure. The planar structure has an upper surface and a lower surface. The markings are formed on the lower surface of the planar structure. Each of the markings includes an elongate raised rib having at least a proximal end adjacent to the lower surface of the planar structure, two elongate opposite site surfaces extending from the proximal ends, and a distal end opposing to the proximal end and to be in direct contact with the underlying object. The side surfaces are angled with the proximal and distal ends to cause visual graduation of a light beam propagating through the raised ribs. The raised ribs have a triangular cross section or an inverse trapezium cross section.

The transparent measuring device may further comprise a plurality of circular grooves formed on the lower surface of the planar structure, and a plurality of O-ring partially embedded in the circular grooves to provide additional non-slip gripping force to the underlying object. Each of the windows further comprises a plurality of notches formed on two elongate edges thereof. The transparent measuring device may further comprise at least one removable handle to be selectively engaged with the planar structure at one of the windows. The handle comprises a finger grip portion to be inserted through the window to rest on the upper surface of the planar structure, a disc portion to remain under the lower surface of the planar structure, and a tether/string extending through the window to interconnect the finger grip portion with the disc portion. The disc portion further comprises a plurality of fins formed along a periphery of a top surface thereof. The window includes a plurality of notches along two elongate edges thereof, such that at least a pair of the fins is engaged with the respective notches to secure the handle to the measuring device.

In one embodiment, the transparent measuring device further comprises an angle or degree guide for measuring and cutting an angled pattern. The angle guide comprises an elongate tab or bar and a protractor member rotatably and removably connected to the elongate tab by a pair of connecting structures. Preferably, the pair of connecting structures includes a male connecting structure protruding from a center of the elongate tab and a female connecting structure formed at an origin of protractor member. To apply the angle guide to the transparent measuring device, the planar structure of the transparent measuring device includes a through hole allowing the male connecting structure to extend through. The elongate tab can thus be placed adjacent to the lower surface of the planar structure with its male connecting structure extending through the planar structure. The protractor member can thus be rotatably connected to the elongate tab on the upper surface of the planar structure by engaging the female connecting structure with the male connecting structure.

The present invention further provides a seam allowance guide attachable to a measuring device that includes at least one window for auto-calculating seam allowance of a desired pattern. The seam allowance guide includes a lower guide bar to be placed transversely under the window and an upper guide bar operative to rotate about an elongate axis of the lower guide bar. The lower guide bar includes an elongate measuring edge and a plurality of notches formed along the measuring edge. The seam allowance guide further comprises a pivoting connection structure projecting from a central area of the lower guide bar and a pair of extension arms pivotally connected to the pivoting connection structure. The upper guide bar is slidably mounted upon the extension arms. The pivoting connection structure includes a pair of vertical sidewalls pivotally connected to the extension arms. The lower portions of the vertical sidewalls further comprises a pair of recesses and a pair of protruding tabs to be engaged with the window. By leveling the recesses with the edges of the window, the seam allowance guide can be rotated horizontally within the window. The window includes a plurality of notches for engaging the protruding tabs, and the seam allowance guide can be secured at the window by engagement of the protruding tabs with the notches. The distance between the lower and upper guide bar indicates the seam allowance of the desired pattern. A plurality of seam allowance markings or indicia may be printed or marked on the extension arms, such that by sliding the upper guide bar to various positions of the extension arms, the required seam allowance can be automatically calculated and obtained.

BRIEF DESCRIPTION OF THE DRAWINGS

These as well as other features of the present invention will become more apparent upon reference to the drawings therein:

FIG. 1 illustrates a transparent measuring device formed in accordance with the present invention;

FIG. 2 is a cutaway portion of the transparent measuring device of FIG. 1 showing the raised ribs of the measuring device;

FIG. 3 is a perspective view of a seam allowance guide member for use with the transparent measuring device as shown in FIG. 1;

FIG. 4 is a cutaway portion of the transparent measuring device of FIG. 1 showing the seam allowance guide of the measuring device in an orientation preparatory for attachment to the measuring device;

FIG. 5 is a cutaway portion of the transparent measuring device of FIG. 1 showing the seam allowance guide in a second orientation mounted to the measuring device;

FIG. 6 is a top view showing the seam allowance guide attached to transparent measuring device;

FIG. 7 shows a side view of the seam allowance guide being used to automatically provide proper seam allowance for cutting fabric;

FIG. 8 depicts the handle members for use on the transparent measuring device;

FIG. 9 is a cross sectional view depicting the O-ring friction elements mounted to the transparent measuring device;

FIG. 10 is a cutaway portion of the transparent measuring device of FIG. 10 showing the handle members used to selectively reposition the measuring device;

FIG. 11 shows the transparent measuring device and an angle guide applied thereto;

FIG. 12 shows a cross sectional view of a cutaway portion of the transparent measuring device and the angle guide attached thereto.

DETAILED DESCRIPTION OF THE INVENTION

Figure 14:
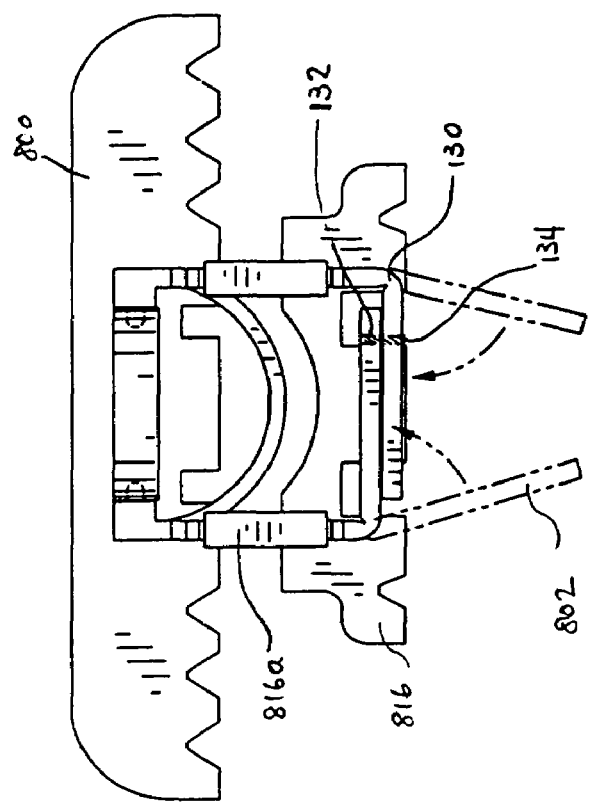
FIGS. 13 and 14 show a living hinge structure of the extension arms of the seam allowance guide.

Referring now to the drawings wherein the showings are for purpose of illustrating preferred embodiments of the present invention only, and not for purposes of limiting the same, FIG. 1 illustrates a transparent measuring device 10 formed in accordance with the present invention. The measuring device 10 includes a planar structure 11 preferably formed of transparent material such as plastic or acrylic. In this embodiment, the planar structure 11 is substantially rectangular with either rounded or sharp corners. It will be appreciated that the planar structure 11 may also be in a shape other than rectangle such as triangle, square, circle, polygon, without exceeding the scope or spirit of the present invention. As shown, the planar structure 11 has an upper surface and a lower surface. Preferably, the upper surface of the planar structure 11 is substantially planar and smooth, such that a light beam transmitting through the upper surface will not be scattered by the profile of the upper surface.

The lower surface of the planar structure 11 includes plural indicia/lines or markings 12 as shown in FIGS. 1 and 2. The raised ribs 12 are formed on the lower surface of the planar structure 11. Preferably but optionally, some of the raised ribs 12 extend from edge to edge to form a plurality of rectangular lattices as shown in FIG. 1, while some of the raised ribs 12 around or within the lattices to serve as finer markings for measurement or cutting. The raised ribs 12 are also formed of transparent material allowing visible light to propagate through. By placing the measuring device 10 on a fabric, the user can see the fabric through the measuring device 10, and align the fabric with the lines or markings for measuring or cutting. As shown in FIG. 2, each of the raised ribs 12 has one proximal end 20 attached directly to the lower surface of the planar structure 11, at least two elongate side surfaces 24 extending from two opposing sides of the proximal end 20, and a distal end 22 having two opposite elongate sides adjacent to both side surfaces 24 of the raised rib 12. In the embodiment as shown in FIG. 2, the proximal ends 20 include planar surfaces adhered or attached to the lower surface of the planar structure 11, and the distal ends 22 include planar surfaces parallel to the proximal ends 20 as well as the lower surface of the planar structure 11. When the measuring device 10 is placed on an object such as a piece of fabric, the direct contact between the distal ends 22 of the raised ribs 12 and the fabric exerts a friction force to deter the measuring device 10 from slipping during marking and cutting process. When the distal ends of the raised ribs 12 are in the form of planar surfaces, the side surfaces 24 are angled with the distal ends 22 by a predetermined degree. Preferably, the areas of distal ends 22 are smaller than that of the proximal ends 20 of the raised ribs 12, such that the angle between the distal ends 22 and the side surfaces 24 is larger than 90°. Alternatively, the distal ends 22 of the raised ribs 12 may be in the form of narrow lines at which the side surfaces 24 merge together. In this manner, each of the raised ribs 12 has a triangular cross section, while the raised ribs 12 having the distal ends 22 in the form of planar surfaces have an inverse trapezium cross section. In either case as mentioned above, the raised ribs 12 serve as prisms to cause visual graduation for light beams incident thereon.

When raised ribs 12 have an inverse trapezoid cross section, the bottoms of the raised ribs 12 are in the form of planar surfaces smaller than and parallel to the lower surface of the planar structure 11. A light beam incident on the distal ends 22 of the raised ribs 12 will emerge from the proximal ends 20 of raised ribs 12 along the same direction. That is, the emerging light from the proximal ends 20 will be parallel to the source light incident onto the distal ends 22. Therefore, the light traveling through the raised ribs 12 will not be refracted to cause any visual graduation. However, as the distal ends 22 are normally very narrow, the light beam incident on the distal ends 22 is very limited. On the contrary, most of the incident light will impinge on the raised ribs 12 at the side surfaces 24 angled with the proximal ends 20 by a degree less than 90°. As a result, the raised ribs 12 server as prisms through which the light is refracted to cause visual graduation. The visual graduation becomes more significant as the surface area of the distal ends 22 decreases. To further emphasize the visual graduation caused by refraction, the raised ribs 12 may also include multi-tiered side surfaces to provide polygonal or irregular cross section.

In addition to the refraction of the raised ribs 12, a light beam incident on any surface will be partially reflected with an angle equal to the incident angle. Therefore, as a number of surfaces (the proximal ends 20, the distal ends 22, and the side surfaces 24) is introduced by the raised ribs 12, more reflection occurs to a light beam propagating through the raised ribs 12 than that propagating through the planar structure 11 only. Therefore, a visual graduation is caused by the reflection of the raised ribs 12. As the raised ribs 12 provide visual graduation to light propagating therethrough, even when the fabric placed underneath the measuring device provides a background color similar to the measuring device, the users can still see the lines or markings in the form of raised ribs 12 to mark and cut the fabric precisely. As shown in FIG. 1, the measuring device 10 further comprises a plurality of lines 30 at various angles and windows 32 along the lines 30 to aid in alignment and provide unobstructed view of the underlying object. Preferably but optionally, the lines 30 are configured with the same structure as the raised ribs 12.

The measuring device 10 further comprises one or more windows 16 extending through the planar structure 10 and at least one seam allowance guide 18 removably attached to the planar structure 10. In this exemplary embodiment as shown, a plurality of rectangular shaped windows 16 are formed in the planar structure 11. Each of the windows 16 includes a plurality of notches or serrations 16a formed on the elongate edges thereof. The notches 16a are preferably arranged in accordance with the lines or markings in the form of raised ribs 12 to provide aid in alignment. In addition to the alignment aid, the notches 16a further provide a latching or locking mechanism for the seam allowance guide 18 as shown in FIGS. 3–7 and handles 19 as shown in FIG. 8. The seam allowance guide 18 and the handles 19 will be described in more details in the following paragraphs of the specification.

As shown in FIG. 3, the seam allowance guide 18 includes an elongate lower guide bar 800 and an upper guide bar 816 for measuring or aligning the finished and unfinished sizes of a pattern to be cut or measured from a fabric underlying the measuring device 10, respectively. The lower guide bar 800 includes an elongate measuring edge on which serrations or notches 800a are formed to aid in measurement and alignment. To interconnect the lower guide bar 800 and the upper guide bar 816, the seam allowance guide 18 further comprises a pivot connection structure 804 extending upright with respect to the lower guide bar 800 and a pair of extension arms 802 pivotally connected to the connection structure 804. In this embodiment, the connection structure 804 is formed as a ring member projecting upwardly from the middle of the lower guide bar 800. The extension arms 802 are pivotally connected to two vertical sides of the connection structure 804, and the upper guide bar 816 is slidably attached to the extension arms 802. As shown, the lower portions of the vertical sides exposed under the extension arms 802 include a pair of recesses 805 and a pair of protruding tabs 806 extending outwardly from the vertical sides which are sized to be engaged with the serrations 16a formed on the sides of the window 16. The extension arms 802 are substantially parallel to each other and pivotally connected to the vertical sides of the connection structure 804 by at least one rotatable connection or fastening devices 808 such as pin or ball joint as shown in FIG. 7. Therefore, the extension arms 802 are operative to rotate from 0° to 180° about an elongate axis of the lower guide bar 800.

The upper guide bar 816 includes a pair of mounting sleeves 816a to receive the extension arms 802 therein. Preferably, the edges of each extension arm 802 are serrated, and the interior surfaces of the sleeves 816a include a conventional detent mechanism which allows the upper guide bar 816 to slide along the extension arms 802 and securely maintains the selected position the upper guide bar 816 at the desired slide position along the extension arms 802. The alignment tab 816b of the upper guide bar 816 has a measuring edge parallel to the elongate measuring edge of the lower guide bar 800. The exterior side surfaces of the extension arms 802 further include seam guidance indicia printed or marked thereon as shown in FIG. 7. The seam guidance indicia includes the seam allowances for various common quilting seam allowances, such as 1¼" for a quarter-square triangle, the seam allowance ⅞" for a half-square triangle and the seam allowance ½" for a square. The seam allowance guidance may include marking in other forms or symbols such as S for square pattern, H for half-square, and Q for quarter-square triangle. As shown in FIG. 3, each of the mounting sleeves 816a includes an open window at an exterior surface thereof. Therefore, by sliding the upper guide bar 816 along the extension arms 802 until the edge of the mounting sleeves 816a is aligned with the desired seam guidance observed through the open window, measurement of patterns with the required seam allowance can be performed. It is appreciated that in addition to quarter-square triangle, half-square triangle and square, the seam allowance guidance for other patterns can also be marked or printed on the extension arms 802 to provide auto-calculation of seam allowance without exceeding the scope and spirit of the present invention.

To selectively attach the seam allowance guide 18 to the planar structure 11 at the window 16, the extension arms 802 are rotated to an upright position relative to the lower guide bar 800, such that the lower guide bar 800 and the upper guide bar 816 extend along a common vertical plane as shown in FIG. 4. By orienting the seam allowance guide 18 aligned with the window 16, the lower guide bar 800 is inserted through the window 16 to reside under the planar structure 11. The transverse extent of the connection structure 804 at the recesses 805 is substantially smaller than the width of the window, and the depth of the recesses 805 is greater than the thickness of the planar structure 11, such that when the recesses 805 are in planar alignment i.e. level with the edges of the window 16, the seam allowance guide 18 can be manually rotated transversely to the window 16 and slide throughout the length of the window 16. When the seam allowance guide 18 is rotated transversely and slide to a desired position of the window 16, the seam allowance guide 18 is pulled upwardly relative to the planar structure 11 to cause the protruding tabs 805 of the guide 18 engaged within the notches 16a formed on opposite sides of the window 16. Thereby, the seam allowance guide 18 is secured to the planar structure 11 with the lower guide bar 800 extending transversely to the window 16 underneath the planar structure 11. When the seam allowance guide 18 is secured to the planar structure 11, the extension arms 802 can be rotated by 90° to rest on the planar structure 11 as shown in FIG. 3, or be rotated to the other side above the window 16 as shown in FIG. 5 for seam allowance measurement.

The seam allowance guide 18 allows a user to automatically calculate and obtain a desired seam allowance. In this regard, when a specific seam allowance is required for cutting a specific pattern from a fabric 600 underlying the measuring device 10, the upper guide bar 816 is manually slide along the extension arms 802 until the edges of the sleeves 816a are aligned with the desired seam guidance marking formed on the exterior side surfaces of the extension arms 802. For example, when a quarter-triangular pattern is required, the upper guide bar 816 slides along the extension arms 802 until the edge of the sleeves 816a are aligned with the marking of 1¼ seam allowance. When the upper guide bar 816 is rotated in contact with the upper surface of the planar structure 11, the edge of the upper guide bar 816 is parallel with the lower guide bar 800 over the window 16 as shown in FIGS. 5–7. The distance between the measuring edges of the upper and lower guide bars 800 and 816 indicates the seam allowance of 1¼". The user may then adjust the position of the seam allowance guide 18 upon the measuring device 11 by aligning the measuring edge of the upper guide bar 800 with a desired graduated raised rib 12 formed on the measuring device 11 which represents the desired finished size of the fabric to be cut. In this position, a pair of specific notches 16a will be aligned with the protruding tabs 806 such that the distance between the cutting edge of the planar structure 11 and the upper guide bar 816 indicates the finished size of the desired quarter-triangular pattern. As the distance between the upper and lower guide bars 816 and 800 indicates the seam allowance for the quarter-triangular pattern, the unfinished sized of the desired pattern is indicated by the distance between the measuring edge of the lower guide bar 800 and the edge of the planar structure 11. Subsequently by aligning the measuring edge of the lower guide bar 800 with the edge of the fabric 600 underlying the measuring device 10 as shown in FIG. 7, the unfinished size for the cut fabric can be obtained by cutting along the cutting edge of the planar structure 11.

To remove the seam allowance guide 18 from the planar structure 11, the extension arms 802 are preferably rotated to the upright position. By pressing the seam allowance guide 18 downwardly relative to the planar structure 11, the protruding tabs 805 will be released from the notches 16a, and then the seam allowance guide 18 may be rotated horizontally by 90° and be removed from the window 16. Alternatively, when a different pattern or a different dimension of fabric is to be marked or cut, by pressing the seam allowance guide 18 downwardly, the protruding tabs 805 are disengaged with the notches 16a. The seam allowance guide 18 can thus be slide along the window 16 towards another position.

The extension arms 802 are connected to each other by a bridge 810 extending transversely therebetween. Preferably but optionally, the extension arms 802 and the bridge 810 are fabricated from transparent and resilient material. As shown in FIGS. 4 and 5, the bridge 808 is curved to substantially conform to the top surface of the connection structure 804, and the bridge 810 is so positioned so as not to be blocked by the connection structure 804 when the extension arms 802 are oriented to the upright position relative to the lower guide bar 800.

Figure 13:
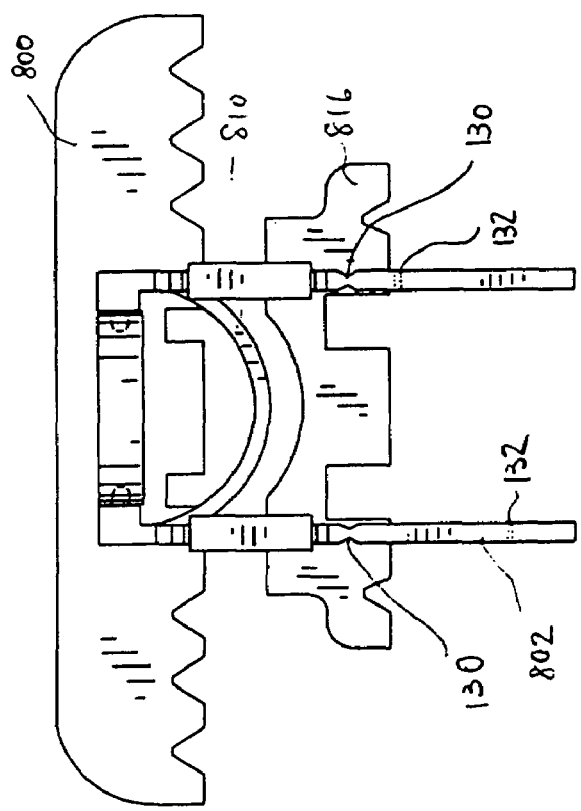

When certain pattern is the more commonly required than other quilting patterns, the seam allowance guide 18 may further comprise a living hinge structure. By the living hinge structure, the upper guiding bar 816 can be fixed at a position where the seam allowance of the commonly cut pattern is automatically calculated. The living hinge structure is illustrated in FIGS. 13 and 14. As shown, the free ends of the extension arms 802 are foldable at hinge points 130 inwardly until both the folded portions of the extension arms 802 are overlapped with each other. Each of the extension arms 802 further comprises a latching structure 132 so positioned that when the folded portions 130 are overlapped with each other, the latching structures 132 are aligned with each other. In this embodiment, the latching structures 132 include holes extending through the extension arms 802. The folded portions 130 can then be secured at the folded position by inserting a fastening device 134 such as a latching pin 134 through the latching structures 132. Alternatively, the latching structures 132 may be a pair of frictional fit structures formed on the interior surface of one extension arm 802 and the exterior surface of the other extension arm 802. Therefore, by pressing one of the folded portions 130 against the other, the folded portions 130 are secured with each other by the engagement of the frictional fit structures.

The lower guide bar 800, the connection structure 804, the extension arms 802 and the upper guide bar 816 are all preferably fabricated from a transparent polymer material. Preferably but optionally, the lower guide bar 800 has a different color tint from the planar structure 11 to provide better visibility thereof. According to specific need, the upper guide bar 812 may also have a color tint the same or different from that of the lower guide bar 800.

To increase the gripping force of the measuring device 10 to the underlying fabric 600, and thereby prevent slippage of the underlying fabric or the cutting mat, the planar structure 11 preferably includes a plurality of circular grooves 14 formed in the lower surface thereof. Preferably but optionally, the circular grooves 14 are formed at positions such as the corners or adjacent the edges of the planar structure 11. As shown in FIG. 8, the formation of the grooves 14 allows standard elastomeric O-rings 40 to be partially embedded in the planar structure 11. As shown in FIG. 9, the lower portions of the O-rings 40 protrude from the lower surface of the planar structure 11 to provide additional contact to the underlying fabric. As a result, slippage of the fabric or the cutting mat underneath the measuring device 10 is prevented.

As shown in FIGS. 8 and 10, the measuring device 10 further comprises at least one detachable or removable handle 19 inserted through the windows 16 to facilitate ease in repositioning of the measuring device 10 upon the underlying fabric. The removable handle 19 includes a finger grip portion 90, a disc portion 92, a tether/string 94, and a latching means 96 formed on the disc portion 92. The finger grip portion 90 can be inserted through the window 16 to reside on the top side of the measuring device 11 while the disc 92 portion resides on the opposite bottom side. The finger grip portion 90 can be formed in various shapes such as triangle, rectangle, circle or even irregular geometric shape. The finger grip portion 90 is interconnected to the disc portion 92 by a tether/string 94. Therefore, when the finger grip portion 90 is inserted through the window 16 at the upper surface of the planar structure 11, the disc portion 92 having a diameter greater than the width of the window, remains at the lower surface of the planar structure 11 to prevent disc portion 92 from passing through the window 16. A user can then grip the finger grip portion 90 by two fingers to lift and reposition the measuring device 11 upon the underlying fabric. In this embodiment, either one or a pair of handles 19 may be used, each dispensed in different windows. In addition, to avoid the handles 19 from sliding within the windows 16, the handle 19 may further comprise a plurality of latching fins 96 formed along the periphery of the top surface of the latching dish 92. The latching fins 96 are sized to be selectively engageable with the notches 16a formed along elongate edges of the window 16. Therefore, the registry between the latching fins 96 and the notches 16 secures the handles 19 at fixed positions of the windows 16 of the planar structure 11 as shown in FIG. 10. To remove the handles 19 from the measuring device, the disc portion 92 is pressed down to disengage the latching fins 96 with the notches 16a, and the finger grip portion 90 is then inserted through the window 16 to the same side of the disc portion 92.

In the exemplary embodiment as shown in FIG. 1, the transparent measuring device 10 is 24 inches by 6 inches. Preferably but optionally, the planar structure 11 is approximately ⅛ inch thick and the raised ribs 12 are approximately 1/32 inch height. As shown, there are lines (raised ribs) 12 at one inch intervals and shorter lines (hatch marks) that are also raised ribs 12 at one eighth (⅛) inch intervals. The embodiment as shown also includes additional lines 30 at various angles that can be used for marking and/or measuring, and small windows 32 along the additional lines 30 to aid in alignment and provide an unobstructed view of the underlying object. It will be appreciated that other embodiments of the measuring device 10 may have different sizes and/or markings at different intervals. For example, interval markings may be structured on the metric system of the measurements.

As shown in FIGS. 11 and 12, the measuring device 10 further comprises an adjustable angle guide 100 that has an elongate bar or tab 102 and a protractor member 104 rotatably and removvbly attached to planar bar 102 at the two opposing sides of the planar structure 11. The angle guide 100 further comprises a pair of connecting structures formed on the origin of the protractor member 104 and the center of the elongate tab 102. Preferably, the connecting structure formed on the elongate tab 102 includes a male connector 110 such as a post projecting upwardly from the center thereof, and the connecting structure formed on the protractor member 104 includes a female connector 106 such as a through hole or a cap formed at the center of the baseline thereof. To apply the angle guide 100 to the transparent measuring device 10, the planar structure 11 of the transparent measuring device 10 includes a through hole 32. As shown in FIG. 11, the protractor member 104 further comprises a plurality of degree indicia or markings 108 marked along the periphery thereof. To facilitate the rotation of the protractor member 104, the through hole 32 is preferably a circular hole, the male connector 110 is preferably in the form of a cylindrical post. The elongate tab 102 is then placed under the planar structure 11 with the male connector 110 extending through the through hole 32 of the planar structure 11. The protractor member 104 is then rotatably connected to the elongate tab 102 on the upper surface of the planar structure 11 by inserting the male connector 110 through or into the female connector 106. Similar to the planar structure 11 and the seam allowance guide 18, the angle guide 100 is preferably fabricated from transparent material. Each of the degree markings 108 represents a fine angle increment or decrement of about 5°, for example. As will be recognized by mounting the angle guide 100 within the through hole 32, a desired angular relationship exists between the edges of the measuring device 10 and edge of the elongate bar 102 of the angle guide 100. Thus by aligning the edge of the bar 102 with the edge of the underlying fabric and cutting the fabric along the length of one cutting edge of the measuring device 10, a proper angle cut of the fabric is facilitated.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A transparent measuring device, comprising:
   a planar structure, having a first surface and a second surface;
   a plurality of markings formed on at least one of the first and second surfaces of the planar structure;
   at least one window extending through the planar structure, wherein an elongate edge of the window extends substantially perpendicularly to an elongate direction of the planar structure; and
   a seam allowance guide to be movably attached to the planar structure at the window.

2. The transparent measuring device of claim 1, wherein the markings include a plurality raised ribs protruding from the first or second surface of the planar structure.

3. The transparent measuring device of claim 2, wherein the raised ribs are fabricated from transparent material.

4. The transparent measuring device of claim 2, wherein the raised ribs are so configured to induce visual graduation of light beams propagating therethrough.

5. The transparent measuring device of claim 1, wherein the window has a rectangular shape.

6. The transparent measuring device of claim 5, wherein the window includes a plurality of notches formed on two opposing elongate sides of the windows.

7. The transparent measuring device of claim 6, wherein the notches are ⅛" long.

8. The transparent measuring device, of claim 1, wherein the planar structure further comprises a plurality of circular grooves recessed from the lower surface thereof.

9. The transparent measuring device of claim 8, further comprises a plurality of elastomeric O-rings partially embedded in the circular grooves.

10. The transparent measuring device of claim 9, wherein each of the O-rings has a cross-sectional diameter equal to or greater than the height of the grooves.

11. The transparent measuring device of claim 1, further comprises at least one handle inserted through one of the windows.

12. A transparent measuring device, comprising:
    a planar structure, having a first surface and a second surface;
    a plurality of markings formed on at least one of the first and second surfaces of the planar structure;
    at least one window extending through the planar structure; and
    a seam allowance guide attached to the planar structure at the window, the seam allowance guide comprising:
      a lower guide bar to extend transversely to the window under the planar structure; and
      an upper guide bar operative to rotate about an elongate axis of the lower guide bar over the planar structure.

13. The transparent measuring device of claim 12, wherein the distance between the lower guide bar and the upper guide bar is adjustable to indicate a seam allowance of a desired pattern.

14. The transparent measuring device of claim 12, wherein the lower guide bar is in the form of an elongate tab.

15. The transparent measuring device of claim 14, wherein the lower guide bar includes an elongate measuring edge and a plurality of notches formed on the measuring edge.

16. The transparent measuring device of claim 12, further comprising:
    a pivoting connection structure projecting from a central portion of the lower guide bar; and a pair of extension arms pivotally connected to the pivoting connection structure, wherein the upper guide bar is slidably attached to the extension arms.

17. The transparent measuring device of claim 16, wherein the extension arms are connected to two opposing vertical sidewalls of the pivoting connection structure.

18. The transparent measuring device of claim 16, wherein the pivoting connection structure includes a pair of recesses and a pair of protruding tabs at lower portions of two vertical sidewalls thereof, such that the seam allowance guide can rotate within the window by leveling the recesses with edges of the window and the seam allowance guide can be secured to the planar structure at the window by engaging the protruding tabs with two notches formed at the window.

19. The transparent measuring device of claim 16, wherein the extension arms are connected to the pivoting connection structure by a pin or a ball joint.

20. The transparent measuring device of claim 16, wherein the extension arms are fabricated from transparent material.

21. The transparent measuring device of claim 16, wherein the seam allowance guide further comprises a bridge extending transversely between the extension arms.

22. The transparent measuring device of claim 21, wherein the bridge is curved and positioned so as to not block pivoting rotation of the extension arms.

23. The transparent measuring device of claim 21, wherein the bridge is fabricated from transparent material.

24. The transparent measuring device of claim 16, wherein the extension arms further comprise a plurality of seam allowance markings thereon.

25. The transparent measuring device of claim 16, wherein the upper guide bar:
   includes a pair of sleeves slidably receiving the extension arms therein; and
   an alignment tab extending between the sleeves to be aligned with any seam allowance marking formed on the extension arms.

26. The transparent measuring device of claim 25, wherein each of the sleeves includes an open window formed on an exterior surface thereof.

27. The transparent measuring device of claim 16, wherein free ends of the extension arms are foldable inwardly at predetermined hinge points along the extension arms to form a pair of folded portions overlapped each other.

28. The transparent measuring device of claim 27, wherein the hinge points are so determined that the seam allowance for a selected pattern is automatically calculated.

29. The transparent measuring device of claim 27, further comprising a pair of latching structures formed on the free, ends of the extension arms.

30. The transparent measuring device of claim 29, wherein the latching structures includes two holes extending through the extension arms.

31. The transparent measuring device of claim 29, further comprising a latching pin inserted through the holes of the extension arms.

32. The transparent measuring device of claim 27, wherein the latching structures include a pair of frictional fit structures formed on the interior surface of one extension arm and the exterior surface of the other extension arm.

33. The transparent measuring device of claim 28, wherein the selected pattern includes a half-square pattern.

34. A transparent measuring device, comprising:
   a planar structure, having a first surface and a second surface;
   a plurality of markings formed on at least one of the first and second surfaces of the planar structure;
   at least one window extending through the planar structure;
   a seam allowance guide attached to the planar structure at the window; and
   at least one handle inserted through one of the windows, wherein the handle comprises:
   a finger grip portion to be inserted through the window at the upper surface of the planar structure;
   a disc portion placed at the lower surface of the planar structure; and
   a tether or a string interconnecting the finger grip portion and the disc portion.

35. The transparent device of claim 34, wherein the disc portion further comprises a plurality of latching fins formed along a periphery of a top surface thereof.

36. The transparent measuring device of claim 35, wherein the window includes a plurality of notches formed along elongate edges thereof, the notches being engageable with the latching fins.

37. A transparent measuring device, comprising:
   a planar structure having an upper surface and a lower surface;
   an angle guide, which includes an elongate tab to be placed under the planar structure;
   a protractor member to be placed on the upper surface of the planar structure, the protractor member being rotatably connected with the elongate tab; and
   a pair of connecting structures extending through the planar structure to rotatably connect the elongate tab and the protractor member.

38. The transparent measuring device of claim 37, wherein the planar structure includes a through hole, and the pair of connecting structures includes:
   a male connector projecting from a center of the elongate tab to extend through the through hole of the planar structure; and
   a female connector formed at a center of a baseline of the protractor member.

39. The transparent measuring device of claim 38, wherein the male connector includes a cylindrical post, and the female connector includes a circular aperture or a cylindrical hollow cap.

40. The transparent measuring device of claim 37 wherein the protractor member is in the form of a half-circle disc member having a plurality of angle or degree indicia marked along a periphery thereof.

41. The transparent measuring device of claim 40, wherein each of the degree marking represents an increment or a decrement of 5°.

42. A transparent measuring device for measuring or cutting an underlying object, comprising:
   a transparent planar structure, having a first surface and a second surface;
   a plurality of transparent markings formed on the second surface of the planar structure, wherein each of the markings includes an elongate raised rib having at least a proximal end adjacent to the second surface of the planar structure, two elongate opposite side surfaces extending from two sides of the proximal ends, and a distal end opposing to the proximal end, wherein the distal ends have a surface area different from that of the proximal ends; and
   a plurality of windows formed in the planar structure.

43. The transparent measuring device of claim 42, wherein the raised ribs have a triangular cross section.

44. The transparent measuring device of claim 42, wherein the raised ribs have an inverse trapezium cross section.

45. The transparent measuring device of claim 42, further comprising a plurality of circular grooves formed on the lower surface of the planar structure.

46. The transparent measuring device of claim 45, further comprising a plurality of O-ring partially embedded in the circular grooves.

47. The transparent measuring device of claim 42, wherein the windows are rectangular.

48. The transparent measuring device of claim 42, wherein each of the windows further comprises a plurality of notches formed on two elongate edges thereof.

49. The transparent measuring device of claim 42, further comprising at least one removable handle to be engaged with the planar structure at one of the window.

50. The transparent measuring device of claim 49, wherein the handle comprises:
a finger grip portion, to be inserted through the window at the upper surface of the planar structure;
a latching dish, to remain at the lower surface of the planar structure; and
a connection tether or string, to interconnect the finger grip portion with the disc portion.

51. The transparent measuring device of claim 50, wherein the disc portion further comprises a plurality of fins formed along a periphery of a top surface thereof.

52. The transparent measuring device of claim 51, wherein the window includes a plurality of notches along two elongate edges thereof, such that at least a pair of the fins is engaged with the respective notches to secure the handle to the measuring device.

53. The transparent measuring device of claim 42, further comprising an angle guide to be mounted to the planar structure.

54. The transparent measuring device of claim 53, wherein the protractor guide comprising:
an elongate bar to be placed adjacent to the lower surface of the planar structure;
a protractor member to be place adjacent to the upper surface of the planar structure, the protractor member being rotatably attached to a center of the elongate bar; and
a plurality of degree markings formed along a periphery of the protractor member.

55. The transparent measuring device of claim 54, wherein each of the degree markings represents an increment or decrement of 5°.

56. The transparent measuring device of claim 54, further comprising a pair of connecting structures extending through the planar structure to rotatably connect the protractor member and the elongate bar.

57. A seam allowance guide attachable to a measuring device that includes at least one window for auto-calculating seam allowance of a desired pattern, the seam allowance guide comprising:
a lower guide bar to be placed transversely under the window, the lower guide bar including an elongate measuring edge; and
an upper guide bar operative to rotate about an elongate axis of the lower guide bar.

58. The seam allowance guide of claim 57, further comprising:
a pivoting connection structure projecting from a central area of the lower guide bar; and
a pair of extension arms pivotally connected to the pivoting connection structure, wherein the upper guide bar is slidably engaged with the extension arms.

59. The seam allowance guide of claim 58, wherein the pivoting connection structure includes a pair of vertical sidewalls to pivotally connect the extension arms, and lower portions of the vertical sidewalls further comprise a pair of recesses and a pair of protruding tabs to be engaged with the window.

60. The seam allowance guide of claim 59, wherein the window includes a plurality of notches for engaging the protruding tabs.

61. The seam allowance guide of claim 59, wherein a plurality of seam allowance indicia or markings are formed on the extension arms.

62. The seam allowance guide of claim 61, wherein the extension arms are foldable at a selected seam allowance marking formed on the extension arms.

63. The seam allowance guide of claim 62, further comprising a pair of latching structures for latching folded portions of extensions arms.

64. The seam allowance guide of claim 58, wherein when the distance between the lower guide bar and the upper guide bar indicates a seam allowance for a desired pattern.

* * * * *